(12) United States Patent
Sigler et al.

(10) Patent No.: US 6,957,450 B2
(45) Date of Patent: Oct. 25, 2005

(54) STANDARDIZED RECREATIONAL VEHICLE SANITARY SYSTEM

(75) Inventors: James A. Sigler, Perrysville, OH (US); Edward McKiernan, Wooster, OH (US)

(73) Assignee: SeaLand Technology, Inc., Big Prairie, OH (US)

( * ) Notice: Subject to any disclaimer, the term of this patent is extended or adjusted under 35 U.S.C. 154(b) by 0 days.

(21) Appl. No.: 10/918,025

(22) Filed: Aug. 13, 2004

(65) Prior Publication Data

US 2005/0010999 A1    Jan. 20, 2005

Related U.S. Application Data

(62) Division of application No. 10/366,058, filed on Feb. 12, 2003, now Pat. No. 6,782,561.
(60) Provisional application No. 60/355,755, filed on Feb. 12, 2002.

(51) Int. Cl.[7] ............................................. E03D 1/00
(52) U.S. Cl. ................ 4/321; 4/300; 4/315; 4/428; 4/458; 296/156
(58) Field of Search ............................. 4/321, 300, 315, 4/428, 458, 312, 323, 420, 431, 434, 252.1; 296/156, 164, 24.1, 24.3; 132/333

(56) References Cited

U.S. PATENT DOCUMENTS

| | | | |
|---|---|---|---|
| 1,303,358 A * | 5/1919 | Montgomery | 4/321 |
| 1,859,127 A * | 5/1932 | Bufmyer | 4/321 |
| 3,585,649 A | 6/1971 | Miya | 4/300 |
| 3,594,825 A * | 7/1971 | Reid | 4/323 |
| 3,843,976 A | 10/1974 | Miya et al. | 4/300 |
| 4,142,261 A | 3/1979 | Johansen | 4/300 |
| 4,222,130 A | 9/1980 | Roberts | 4/321 |
| 4,865,631 A * | 9/1989 | Stroby et al. | 4/321 |
| 4,974,899 A * | 12/1990 | Sargent | 296/156 |
| 5,206,962 A * | 5/1993 | Thorwaldson | 4/323 |
| 5,214,807 A | 6/1993 | Terve | 4/321 |
| 5,819,326 A | 10/1998 | Kobayashi et al. | 4/252.1 |
| 6,223,361 B1 * | 5/2001 | Rozenblatt | 4/321 |
| 6,292,956 B1 | 9/2001 | Kayahara | 4/420 |
| 6,421,843 B1 | 7/2002 | Mellinger et al. | 4/319 |

* cited by examiner

Primary Examiner—Khoa D. Huynh
(74) Attorney, Agent, or Firm—Pearne & Gordon LLP

(57) ABSTRACT

A sanitary system including a toilet adapted for use in a recreational vehicle, and a recreational vehicle including the toilet and sanitary system. The sanitary system includes a horizontally offset waste storage receptacle to be installed in a stowage compartment of the recreational vehicle; a discharge port having an angular portion to be located at least partially above a floor of the recreational vehicle, such that the discharge port defines an interior passage directing waste through the floor of the recreational vehicle at an angle relative to a vertical axis in a direction toward the waste storage receptacle; and a toilet having a fitting disposed within a base portion to be secured to the floor of the recreational vehicle, the fitting defining an interior passage between the toilet and the discharge port, wherein the fitting is sized to communicate with the discharge port in a manner that allows the angular portion of the discharge port to be located at least partially above the floor of the recreational vehicle.

8 Claims, 3 Drawing Sheets

US 6,957,450 B2

STANDARDIZED RECREATIONAL VEHICLE SANITARY SYSTEM

BACKGROUND OF THE INVENTION

1. Field of the Invention

The present invention is directed in general to waste handling systems, and more particularly to a standardized sanitary system that can be installed in a recreational vehicle such that waste is discharged from the toilet at a point that is not horizontally aligned with an inlet of a waste storage receptacle. According to the present invention, the waste storage receptacle can be installed to make efficient use of the limited space of the recreational vehicle.

2. Description of Related Art

Recreational vehicle ("RV") manufacturers offer potential buyers a variety of RV models to choose from. Each model is unique and contains features adapted to fit the needs of particular buyers. To meet these needs and include all of the desired features in the RV, the RV manufacturer must install components at locations that make efficient use of the limited space within the RV. This often requires the components to be altered for such efficient installation on the different RV models offered by the RV manufacturer, requiring the manufacturer to inventory large numbers of these components.

Sanitary systems for RVs are included in the group of components that are custom installed depending on the model of the RV. A conventional gravity feed RV toilet is installed directly above a receptacle that receives and holds human waste, commonly referred to as a holding tank. As the name of the toilet implies, waste in the toilet is flushed along with an optional flush solution through a vertical pipe that forms an interior passage from a bowl portion of the toilet to the holding tank. Thus, gravity drains the waste from the bowl portion into the holding tank. According to this arrangement, though, the outlet of the bowl has to be horizontally aligned in registry with an inlet of the holding tank. This requirement prevents the RV manufacturer from placing any component other than the holding tank directly below the toilet, even if this is not the most efficient arrangement of the components.

To allow the RV manufacturer some discretion in choosing a location for the holding tank relative to the toilet, an angular fitting was included at the outlet of the bowl portion to incline the previously vertical pipe defining the passage between the bowl portion and the holding tank. To prevent blockage of the pipe, the angular fitting can not hold the pipe in an orientation that deviated more than 45° from the vertical position. Due to space limitations on the RV, a step was installed under the toilet to maximize the distance between the toilet and the holding tank. By maximizing this distance, the angular fitting allowed the pipe to extend a substantial horizontal distance away from the position directly beneath the toilet. This allows the holding tank to be installed at a horizontally offset position relative to the outlet of the toilet, if needed, to make efficient use of the limited space on the RV. However, to prevent the height of a seat of the toilet from exceeding a suitable height to accommodate a majority of users, a reduced height base portion of the toilet is used to offset the added height from the step. The height of the step varies with the model of the RV and the amount of horizontal displacement between the holding tank inlet and the outlet of the bowl portion required to efficiently install the holding tank. Since components such as the toilet are typically supplied to the RV manufacturer by third parties, the RV manufacturer is required to inventory a number of toilets with different base portion heights to ensure their availability during production of RVs.

Alternatives to gravity feed toilets have been developed to overcome such difficulties. Vacuum feed toilets operate by creating a vacuum at the outlet of the bowl portion to remove waste therein. Just as with the gravity feed toilets, the waste removed from the bowl portion is stored in the holding tank. But unlike the gravity feed toilets, the pipe defining the passage between the bowl portion and the holding tank can form an angle of greater than 45° from the vertical position because the vacuum will prevent blockage of the pipe with waste. However, such vacuum feed toilets are expensive and require additional features to be installed in the RV, features that occupy more of the already limited available space.

Accordingly, it would be beneficial to provide a low-cost toilet adapted for use on a RV that would give the RV manufacturer discretion in locating the holding tank in a horizontally offset position relative to the toilet. The toilet should not require structural modifications of the RV, and should have a standardized design such that it can be installed on different models of RVS.

SUMMARY OF THE INVENTION

In accordance with one aspect, the present invention includes a toilet adapted for use in a recreational vehicle to discharge waste to a horizontally offset receptacle installed in the recreational vehicle. The toilet includes a bowl portion shaped to receive and direct waste through an outlet formed in the bowl portion, a base portion supported on a floor of the recreational vehicle to support the bowl portion and form at least part of an enclosure that has a vertical axis extending through the base portion and the bowl portion, a discharge port defining an interior passage to be located adjacent to a floor of the recreational vehicle to direct waste through the floor toward the receptacle, and a fitting to couple the discharge port to the outlet of the bowl portion. The fitting is sized to permit at least part of an angular portion of the discharge port to be located within the enclosure that is at least partially formed by the base to direct waste being discharged in a direction toward the receptacle.

In accordance with another aspect, the present invention further includes a sanitary system adapted for use in a recreational vehicle to discharge waste to a horizontally offset destination. The sanitary system includes a horizontally offset waste storage receptacle to be installed in a stowage compartment of the recreational vehicle; a discharge port having an angular portion to be located at least partially above a floor of the recreational vehicle such that the discharge port defines an interior passage directing waste through a floor of the recreational vehicle at an angle relative to a vertical axis in a direction toward the waste storage receptacle; and a toilet having a fitting disposed within a base portion to be secured to a floor of the recreational vehicle. The fitting defines an interior passage between the toilet and the discharge port, wherein the fitting is sized to communicate with the discharge port in a manner that allows the angular portion of the discharge port to be located at least partially above the floor of the recreational vehicle.

In accordance with yet another aspect, the present invention further includes a recreational vehicle having a sanitary system that discharges waste to a horizontally offset destination. The recreational vehicle includes an interior divided into a cabin and a stowage compartment by a floor, the interior being defined by upright walls, a roof, and a base mounted on a mobile chassis; a toilet disposed within the cabin of the recreational vehicle interior, the toilet having a bowl portion supported on a base portion that extends between the bowl portion and the floor; a waste storage receptacle disposed within the stowage compartment of the recreational vehicle interior and horizontally offset relative to the toilet for receiving and storing waste deposited in the bowl portion of the toilet; a discharge port having an angular portion adapted to direct waste through an aperture in the floor at an angle relative to a vertical axis; and a conduit defining an interior passage between the discharge port and the waste storage receptacle through which waste can pass. The toilet according to the yet another aspect includes a fitting within the base portion, the fitting being sized to permit the location of the angular portion at least partially above the floor.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION OF AN EXAMPLE EMBODIMENT

Figure 1:
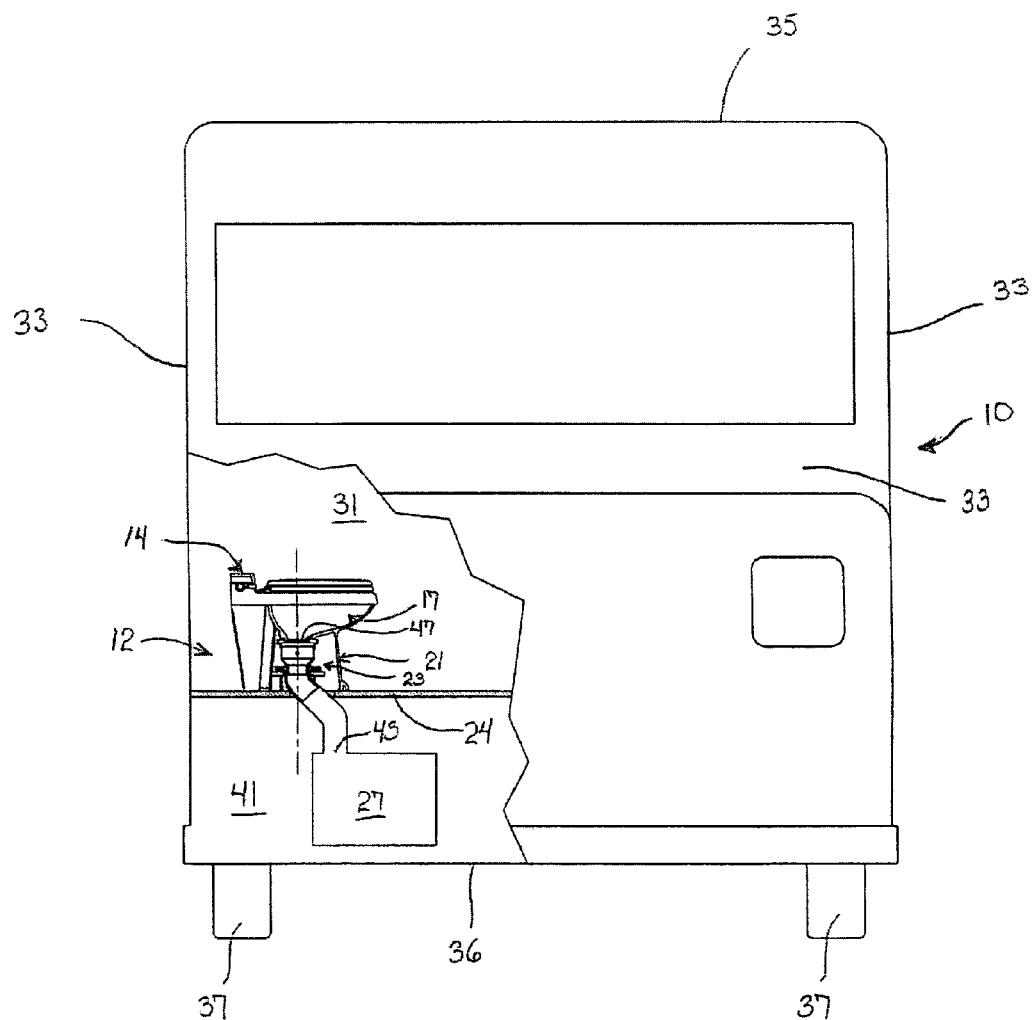
FIG. 1 is an illustrative view of an example arrangement of a standardized sanitary system including a toilet, in accordance with the present invention, as installed in a RV, a portion of the RV being cut away to illustrate the standardized sanitary system in an environment in which it is intended to be used.

Certain terminology is used herein for convenience only and is not to be taken as a limitation on the present invention. Further, in the drawings, the same reference numerals are employed for designating the same elements throughout the four figures, and in order to clearly and concisely illustrate the present invention, certain features may be shown in somewhat schematic form.

An example of a recreational vehicle ("RV") 10 having a sanitary system 12 in accordance with the present invention is illustrated in FIG. 1. RVS are known vehicles that generally include an occupant enclosure called a cabin 31 formed from upright walls 33, including front and rear walls, that extend between a roof 35 at one end and a floor 24 at the other end. The cabin 31 is supported above a stowage compartment 41 formed between the floor 24 and a base 36. Components of the RV are disposed within the stowage compartment 41, which is often partitioned into sub compartments to provide storage areas for items such as luggage that typically accompany occupants of the RV during their travels. The cabin 31 and stowage compartment 41 are mounted on a mobile chassis having wheels 37 supported by a suitable suspension system (not shown) to allow the RV to navigate public roads.

FIG. 1 illustrates an example of a sanitary system 12 located within the cabin of the RV 10. The sanitary system 12 includes a toilet 14 having a bowl portion 17 that is supported by a base portion 21 secured to the floor 24 of the RV 10. A waste storing receptacle, commonly referred to as a holding tank 27, is disposed generally beneath the toilet in the stowage compartment 41 to receive waste that is gravitationally removed from the toilet 14. A plumbing network 23 defines an interior passage through which waste is transported from the bowl portion 17 to the holding tank 27. In FIG. 1, the holding tank 27 has been installed in the stowage compartment 41 at a location to make efficient use of the limited space therein. In that location, an inlet 43 of the holding tank 27 is horizontally offset relative to an outlet 47 of the bowl portion 17.

Figure 2:
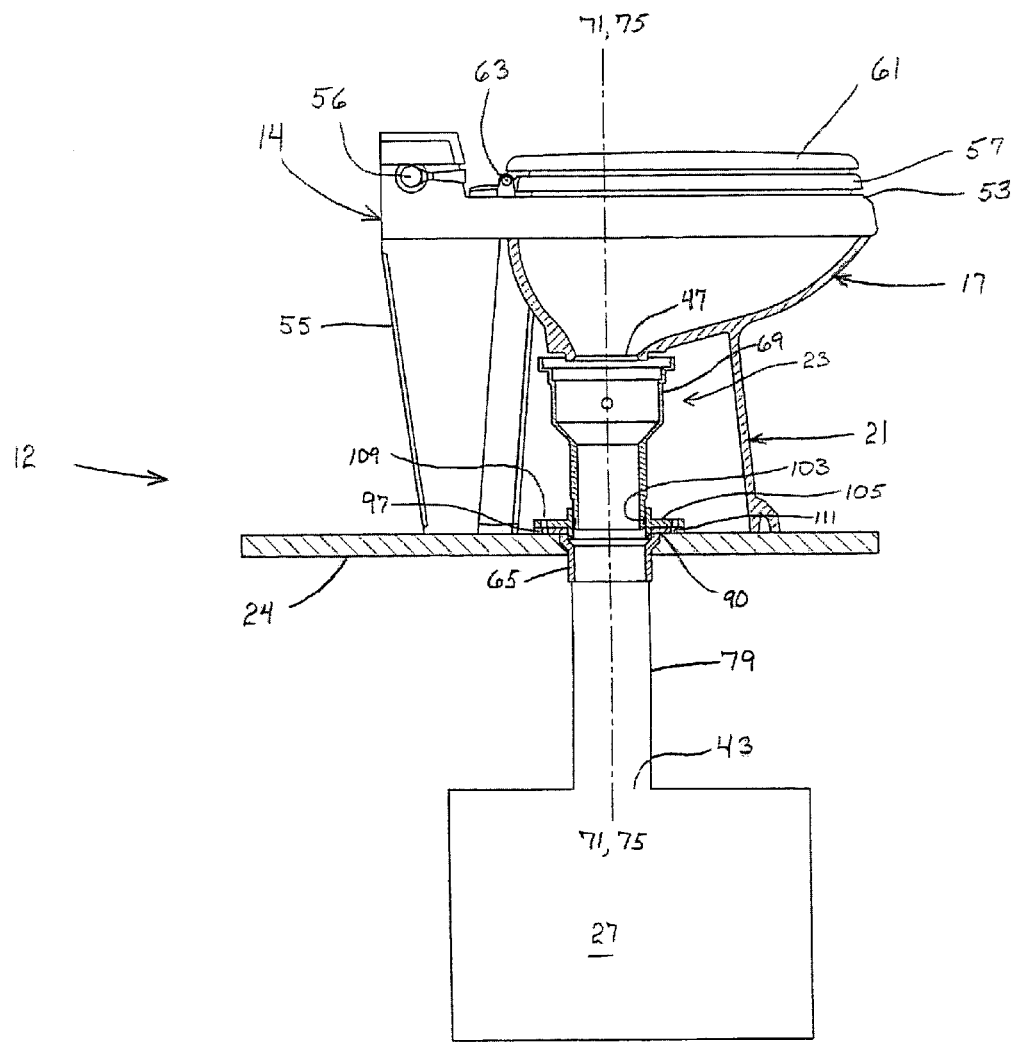
FIG. 2 is a cross-sectional view showing an illustrative arrangement of a standardized sanitary system including a toilet, in accordance with the present invention, relative to a holding tank disposed generally in horizontal alignment with an outlet of the standardized toilet.

FIG. 2 shows a linear arrangement of the inlet 43 of the holding tank 27 relative to the outlet 47 of the bowl portion 17. The outlet 47 is concentric about an axis 71 and the inlet 43 is concentric about an axis 75. The holding tank 27 is typically installed in the stowage compartment 41 to separate the holding tank 27 from the cabin 31 of the RV 10 and to contain any objectionable odors or spillage from the holding tank 27. Installing the holding tank 27 such that the axis 75 of the inlet 43 is linearly aligned with the axis 71 of the outlet 47 horizontally aligns the outlet 47 and the inlet 43 in vertical registry. According to this arrangement, gravity moves waste from the bowl portion 17, through the outlet 47 and the plumbing network 23, and directly into the holding tank 27 via the inlet 43.

Figure 3:
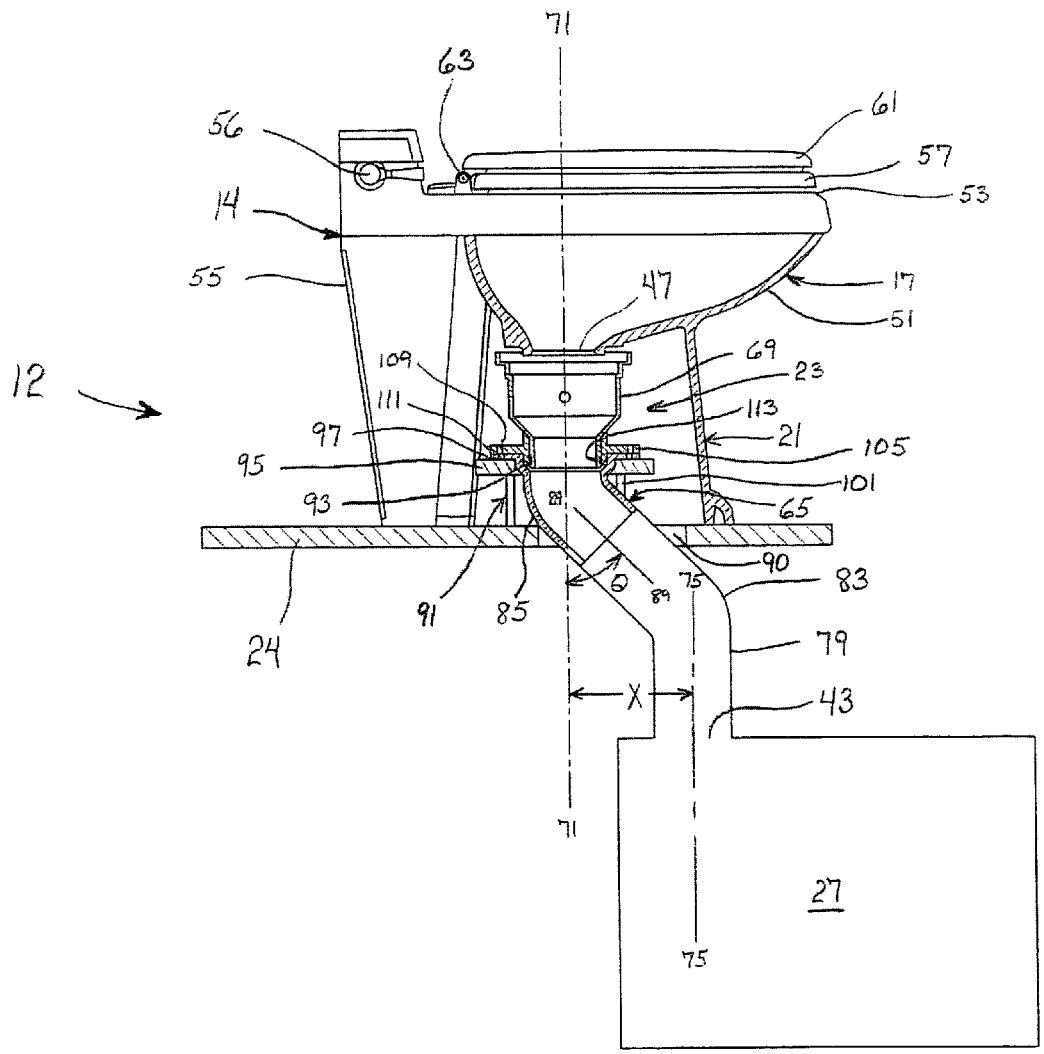
FIG. 3 is a cross-sectional view showing an illustrative arrangement of a standardized sanitary system including a toilet, in accordance with the present invention, relative to a holding tank that is horizontally offset from an outlet of the standardized toilet.

FIG. 3 shows an example arrangement including installation of the holding tank 27 at a location such that the outlet 47 and the inlet 43 are not horizontally aligned in vertical registry. Instead, the outlet 47 and the inlet 43 are horizontally offset from each other. According to this example arrangement, the axis 75 and the axis 71 are not linearly aligned, but separated by a distance X in a radial direction from either axis. A conduit 79 forming an angle Θ with the axis 71 defines an interior passage through which waste can pass from a discharge port 65 to the inlet 43 of the holding tank 27. The angle Θ should be between 0 and 45 degrees from the vertical axis. Waste can thus break the plane of the floor 24 through aperture 90 at the angle Θ as it is being transported to the holding tank 27. The conduit 79 can include an angular portion 83 to provide a generally orthogonal communication between the conduit 79 and the inlet 43 of the holding tank 27.

The bowl portion 17 includes a toilet bowl 51 having an opening (not shown) through which occupants of the RV can deposit waste into the sanitary system 12. A rim of the toilet bowl 51 is covered by a cap 53 extending from a tank structure 55 forming a rear portion of the toilet 14. The tank structure 55 is to be installed adjacent a wall 33 of the RV 10 to contain a flush solution (not shown) such as water, soap, fragrance, disinfectant, or a combination thereof for example, to partially suspend waste being gravitationally removed from the toilet 14. RVS 10 can include a reservoir (not shown) for storing a supply of the flushing solution and/or an interface (not shown) capable of linking the sanitary system 12 to an external source of the flushing solution. A switch 56 is disposed adjacent to the tank structure 55 to activate the release of the flush solution when removal of the waste from the bowl portion 17 is desired.

Further included as part of the bowl portion 17 are a seat 57 and a lid 61 pivotally connected to the bowl portion 17 by a hinge assembly 63. The seat 57 and lid 61 can be pivoted between a down position and an up position. FIG. 2 illustrates both the seat 57 and the lid 61 in the down position. The seat 57 is formed to provide a contoured surface about at least a portion of the circumference of the rim of the toilet bowl 51 without interfering with the passage of waste through the opening in the toilet bowl 51. When the seat is placed in the down position, it provides a contoured surface upon which an occupant of the RV can sit to deposit waste into the toilet bowl 51. Between uses of the sanitary system, the lid 61 can be placed in the down position to cover the opening in the toilet bowl 51 to prevent items from inadvertently entering the toilet bowl 51. When the seat 57 and/or lid 61 are place in the up position, they are maintained in an upright orientation, allowing complete exposure of the opening in the toilet bowl 51.

The toilet bowl 51 is suitably shaped to direct waste therein through the outlet 47. For example, the toilet bowl may be arcuately shaped to impart a vertical force and a horizontal force on the waste as a result of the gravitational force. Another example of a suitably shaped bowl 51 is a toilet bowl 51 having inclined surfaces that likewise impart a vertical and horizontal force on the waste being subjected to gravity. In both examples, the toilet bowl 51 has a funneling effect on the waste to direct it generally toward the outlet 47. Waste directed in this manner passes through the outlet 47 formed in the toilet bowl 51 and enters the interior passage defined by the plumbing network 23.

The plumbing network 23 includes the discharge port 65 coupled to the bowl portion 17 by a fitting 69 in communication with the outlet 47. The fitting 69 is suitably sized to permit location of at least part of an angular portion 85 of the discharge port 65 to be located within the enclosure formed by the base portion 21 when the plumbing network 23 is installed. The enclosure formed by the base portion 21 is bounded in a radial direction from the axis 71 between the tank structure 55 and the base portion 21, and bounded in an axial direction along the axis 71 between the bowl portion 17 and the floor 24. Accordingly, a length of the discharge port 65 within the enclosure formed by the base portion 21 is not necessarily concentric about the axis 71, but is instead concentric about an axis 89 forming the angle Θ with the axis 71. The length of the discharge port 65 can extend through an aperture 90 in the floor 24, thereby providing an interior passage through the plane of the floor 24. In this orientation, the waste passes through the plain of the floor 24 at the angle Θ as it is being transported to the holding tank.

A riser 91 supports the plumbing network 23 at a suitable height above the floor 24 to ensure communication with the outlet 47 of the bowl portion. The riser 91 includes a platform 93 having a hole 95 formed therein through which the discharge port 65 extends. Members 101 support the platform at the suitable height above the floor 24 at locations about the hole 95. A collar 97 disposed adjacent to an end of the discharge port 65 has a greater diameter than that of the discharge port 65 itself. This collar is supported on a surface of the platform 93 to maintain the height of the discharge port 65 above the floor 24.

Although the present invention has been described above to include a riser 91 supporting the plumbing network 23, it can be appreciated by those skilled in the art that other suitable structures can be used in the place of the riser 91. For example, the height of the platform 93 can be supported by members (not shown) extending from a portion of the toilet 14. The scope of the present invention includes these other suitable structures.

A fastener 105 couples the discharge port 65 to the fitting 69 to provide a sealed connection. The fastener 105 includes a locking feature 109 to be used with a compatible locking feature 111 of the collar 97, thereby maintaining the position of the fastener 105 relative to the collar 97. Such locking features 105, 111 can include a compatible tab and slot assembly, alignable holes through which a common fastener can extend, and/or an adhesive, for example. A gasket 113 to be located between the fastener 105 and the fitting 69 minimizes leakage of the flush solution and waste at this connection.

From the above description of the invention, those skilled in the art will perceive improvements, changes and modifications. Such improvements, changes and modifications within the skill of the art are intended to be covered by the appended claims.

What is claimed is:

1. A sanitary system adapted for use in a recreational vehicle to discharge waste to a horizontally offset destination, the sanitary system comprising:
   a horizontally offset waste storage receptacle to be installed in a stowage compartment of the recreational vehicle, said horizontally offset waste storage receptacle having an inlet;
   a discharge port having an angular portion to be located at least partially above a floor of the recreational vehicle, wherein the discharge port defines an interior passage directing waste through the floor of the recreational vehicle at an angle relative to a vertical axis in a direction toward the inlet of the horizontally offset waste storage receptacle; and
   a toilet having a bowl portion with an outlet formed in the bowl portion, and a fitting disposed within a base portion to be secured to the floor of the recreational vehicle, the base portion and the floor of the recreational vehicle cooperate to form an enclosure that has the vertical axis extending through the base portion and the bowl portion, the fitting having one end coupled to the discharge port and an opposite end coupled to the outlet of the bowl portion, the fitting defining an interior passage between the toilet and the discharge port, wherein the fitting is in fluid communication with the discharge port in a manner that allows the angular portion of the discharge port to be located at least partially above the floor of the recreational vehicle in the enclosure, wherein the path from the outlet of the bowl portion to the inlet of the horizontally offset waste storage receptacle does not deviate from the vertical axis by more than forty five degrees.

2. The sanitary system according to claim 1 further comprising a riser to be located within the base portion of the toilet and to support the fitting at a height above the floor of the recreational vehicle.

3. The sanitary system according to claim 2 further comprising a collar extending from the discharge port, wherein the discharge port is supported by the collar upon the riser such that the discharge port extends through a hole in the riser.

4. The sanitary system according to claim 1 further comprising a riser to be located within the base portion of the toilet and to support the discharge port at a height above the floor such that the angular portion of the discharge port is at least partially located above the floor.

5. The sanitary system according to claim 1 further comprising a gasket to seal the connection between the fitting and the discharge port.

6. The sanitary system according to claim 1 further comprising a conduit extending between the discharge port and an inlet to the waste storage receptacle.

7. The sanitary system according to claim 6, wherein the conduit includes an angular portion to allow orthogonal communication between the conduit and the inlet to the waste storage receptacle.

8. A recreational vehicle having a sanitary system that discharges waste to a horizontally offset destination, the recreational vehicle comprising:

an interior divided into a cabin and a stowage compartment by a floor, the interior being defined by upright walls, a roof, and a base mounted on a mobile chassis;

a toilet disposed within the cabin of the recreational vehicle interior, the toilet having a bowl portion supported on a base portion that extends between the bowl portion and the floor, the bowl portion having an outlet formed in the bowl portion, wherein the base portion and the floor of the recreational vehicle cooperate to form an enclosure;

a waste storage receptacle disposed within the stowage compartment of the recreational vehicle interior and horizontally offset relative to the toilet for receiving and storing waste deposited in the bowl portion of the toilet, said horizontally offset waste storage receptacle having an inlet;

a discharge port having an angular portion located at least partially above the floor of the recreational vehicle, said discharge port defines an interior passage directing waste through an aperture in the floor at an angle relative to a vertical axis in a direction toward the inlet of the horizontally offset waste storage receptacle, wherein the enclosure has the vertical axis extending through the base portion and the bowl portion;

a conduit defining an interior passage between the discharge port and the waste storage receptacle through which waste passes; and a fitting disposed within the base portion, the fitting having one end coupled to the discharge port and an opposite end coupled to the outlet of the bowl portion, the fitting defining an interior passage between the toilet and the discharge port, wherein the fitting is in fluid communication with the discharge port in a manner that allows the angular portion of the discharge port located at least partially above the floor of the recreational vehicle in the enclosure, wherein the path from the outlet of the bowl portion to the inlet of the horizontally offset waste storage receptacle does not deviate from the vertical axis by more than forty five degrees.

\* \* \* \* \*

UNITED STATES PATENT AND TRADEMARK OFFICE
CERTIFICATE OF CORRECTION

PATENT NO. : 6,957,450 B2
DATED : October 25, 2005
INVENTOR(S) : Siigler et al.

It is certified that error appears in the above-identified patent and that said Letters Patent is hereby corrected as shown below:

Column 1,
Line 31, delete "waist" and insert -- waste --.

Column 5,
Line 9, delete "place" and insert -- placed --.

Signed and Sealed this

Sixteenth Day of May, 2006

JON W. DUDAS
*Director of the United States Patent and Trademark Office*